(12) United States Patent
Apte et al.

(10) Patent No.: US 6,775,822 B1
(45) Date of Patent: Aug. 10, 2004

(54) METHOD AND APPARATUS FOR PASSING NULL REFERENCES BETWEEN SOFTWARE COMPONENTS THROUGH LEGACY FRAMEWORK

(75) Inventors: Ajay A. Apte, Austin, TX (US); Christohper Lawrence Brealey, Markham (CA)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 09/692,552

(22) Filed: Oct. 19, 2000

(51) Int. Cl.[7] .......................... G06F 9/45; G06F 15/16; G06F 3/00

(52) U.S. Cl. ...................... 717/120; 717/136; 709/202; 719/317

(58) Field of Search .................... 717/120, 101, 717/102, 103, 136, 137; 707/104.1, 10, 103 R, 103, 103 Y, 103 Z; 709/201, 202, 203, 217, 219, 313, 317; 719/313, 317

(56) References Cited

U.S. PATENT DOCUMENTS

| | | | |
|---|---|---|---|
| 5,878,411 A | 3/1999 | Burroughs et al. ............ 707/4 |
| 6,044,370 A | 3/2000 | Anfindsen ...................... 707/4 |
| 6,085,196 A | 7/2000 | Motoyama et al. ......... 707/102 |
| 6,094,664 A | 7/2000 | Ungar .......................... 707/206 |
| 6,112,207 A | * 8/2000 | Nori et al. ................... 707/101 |
| 6,112,210 A | * 8/2000 | Nori et al. ............... 707/103 R |
| 6,332,163 B1 | * 12/2001 | Bowman-Amuah ......... 709/231 |

* cited by examiner

Primary Examiner—Todd Ingberg
Assistant Examiner—Eric B. Kiss
(74) Attorney, Agent, or Firm—Duke W. Yee; David A. Mims, Jr.; Stephen J. Walder, Jr.

(57) ABSTRACT

Intermediary frameworks allow software components to agree on sentinel values. When a software component attempts to pass a null value to a software component that does not support null values, an intermediate framework replaces the null value with a corresponding sentinel value. When a software component that is not null-capable attempts to pass a sentinel value to a null-capable software component, the intermediate framework replaces the sentinel with a null value. The sentinel values may be randomly generated or assigned by a user. A sentinel value is a valid data value that is never used during program execution. A user may designate the sentinel values based on the data models of the software components.

42 Claims, 3 Drawing Sheets

METHOD AND APPARATUS FOR PASSING NULL REFERENCES BETWEEN SOFTWARE COMPONENTS THROUGH LEGACY FRAMEWORK

BACKGROUND OF THE INVENTION

1. Technical Field

The present invention relates to passing null references between software components and, in particular, to passing null references between a null-capable software component and a component that is not null-capable. More particularly, the present invention passes null references using sentinel values.

2. Description of Related Art

Application frameworks communicate with persistent data stores to retrieve application-specific data. In a client-server environment, clients typically are implemented using programming models, such as common object architecture the Common Object Request Broker Architecture (CORBA™) programming model, to communicate with application servers to persist application-specific information backend databases. The CORBA™ programming model is a standard from the Object Management Group (OMG) for communicating between distributed objects. Objects are self-contained software modules. The CORBA™ programming model provides a way to execute objects written in different programming languages running on different platforms no matter where they reside in the network. The CORBA™ programming model is often described as an "object bus" or "software bus," because it is a software-based communications interface through which objects are located and accessed.

The application servers that the applications run on typically provide "containers" that transfer information between a persistent backend and the application logic. In cases where the application logic is implemented using an objected-oriented paradigm, application-specific information may be in the form of primitive data types or more complex object types. For object types that need to be persisted, a common value to be stored is a "null" value. For a null value, the object is not created. An "object" is any data that can exist and have a state, meaning primitive types as well as, but distinct from class instances.

Some recent databases, such as the Database 2™ database from International Business Machines Corporation, are null-capable, meaning they are capable of storing null values. However, many legacy backend systems, such as applications written in Customer Information Control System (CICS™) and Information Management System (IMS™) programming models from IBM, are not null-capable. The use of legacy backend systems that are not null-capable creates a problem in deploying null-capable client applications that need to persist null values in the legacy systems.

Conversely, certain programming models, such as clients using the legacy CORBA™ programming model, are not null-capable. Client applications written in programming models that are not null-capable cannot retrieve data from null-capable backend systems.

Additionally, certain legacy application frameworks, referred to as "containers" or "glue code," that provide communication between server applications and data stores do not support null values. The use of glue code that is not null-capable creates a problem, even for null-capable client applications that attempt to persist data in null-capable databases.

Therefore, it would be advantageous to have a method and apparatus for passing null references between software components through a legacy framework.

SUMMARY OF THE INVENTION

The present invention allows software components to agree on sentinel values. When a software component attempts to pass a null value to a software component that does not support null values, an intermediate framework replaces the null value with a corresponding sentinel value. When a software component that is not null-capable attempts to pass a sentinel value to a null-capable software component, the intermediate framework replaces the sentinel with a null value. The sentinel values may be randomly generated or assigned by a user. A sentinel value is a valid data value that is never used during program execution. For example, for an integer sentinel value one would not use a fraction or floating point number, but one would use an integer, such as 9999, that will never be used during regular program execution.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
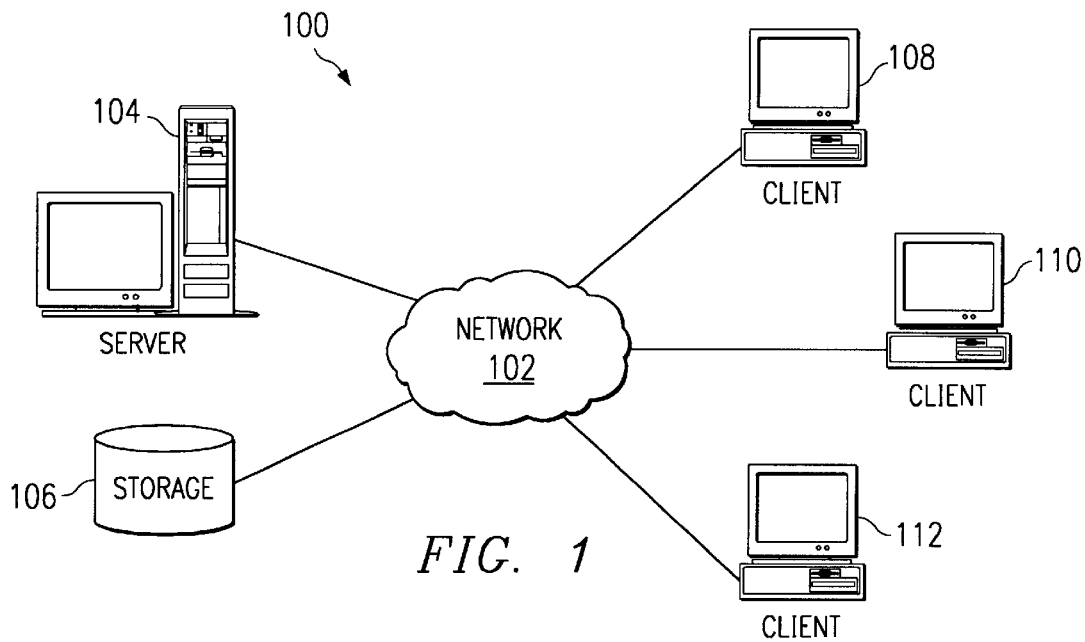
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
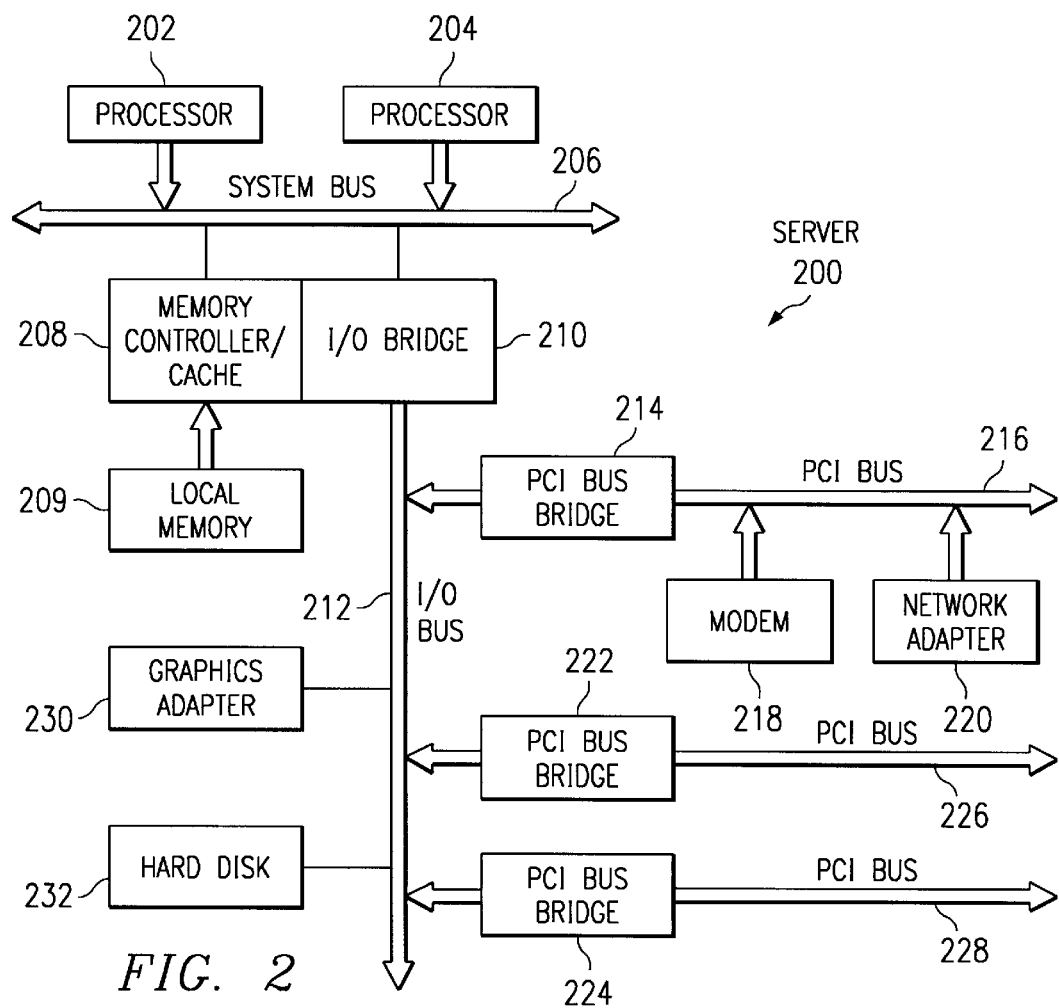
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/SYSTEM 6000 data processing system, a product of International Business Machines Corporation in Armonk, N.Y., running the Advanced Interactive Executive (AIX™) operating system.

Figure 3:
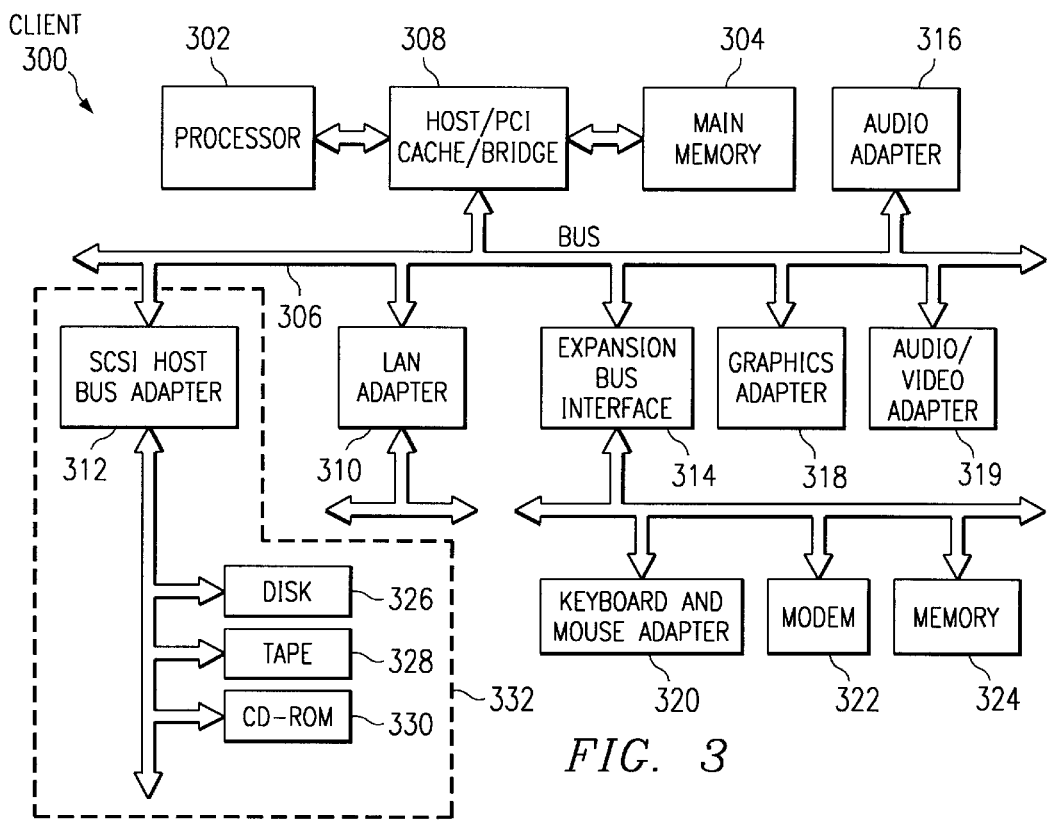
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as the WINDOWS 2000 operating system, which is available from Microsoft Corporation. An object oriented programming system such as the JAVA programming system may run in conjunction with the operating system and provide calls to the operating system from programs written in the JAVA programming language or applications executing on data processing system 300. "JAVA" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. The data processing system depicted in FIG. 3 may be, for example, an IBM RISC/SYSTEM 6000 system running the Advanced Interactive Executive (AIX) operating system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

Figure 4A:
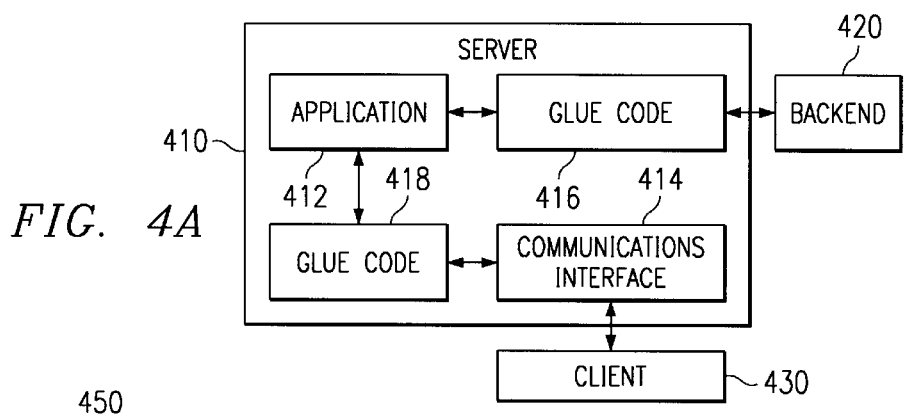
FIGS. 4A and 4B are block diagrams illustrating exemplary software configurations in accordance with a preferred embodiment of the present invention.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance With reference now to FIG. 4A, a block diagram is shown illustrating an exemplary software configuration in accordance with a preferred embodiment of the present invention. Server 410 communicates with client 430 and backend 420. The client may make program calls to the server and persist data in the backend. Server 410 includes application logic 412 and communications interface 414, which handles program calls from the client.

Glue code 418 allows application logic 412 to work with communications interface 414. Similarly, glue code 416 allows application logic 412 to work with backend 420. The communications interface may comprise primitive object types, while the application logic may comprise more complex object types. Thus, glue code 418 allows the primitive object types to communicate with the more complex object types.

One or more of the software components may be incapable of supporting null values. For example, application logic 412 may be null-capable, while communications interface 414 may not support null values. In accordance with a preferred embodiment of the present invention, when glue code 418 extracts a null string object from the null-capable software component, it replaces it with a predefined sentinel value before passing it to software component that does not support null values. Furthermore, when glue code 418 extracts a sentinel value from a software component that does not support null values, it replaces the sentinel value with a null string object before passing it to the null-capable software component.

Still further, the application logic and RDBMS may be null-capable, but glue code 416 may be a legacy framework, which does not support null values. Thus, the present invention may provide intermediate code between the application and the glue code and between the backend and the glue code to translate between null values and sentinel values. Similarly, the application logic and communications interface may be null-capable, but glue code 418 may be a legacy framework, which does not support null values. Thus, the present invention may provide intermediate code between the application and the glue code and between the communications interface and the glue code to translate between null values and sentinel values.

Figure 4B:
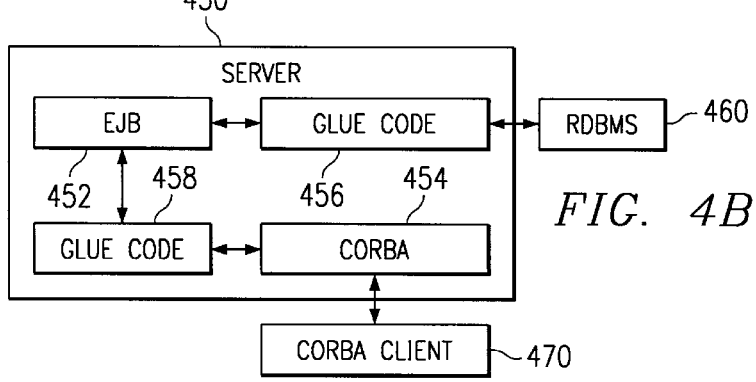

Turning now to FIG. 4B, a block diagram is shown illustrating a more specific exemplary software configuration in accordance with a preferred embodiment of the present invention. Server 450 communicates with relational database management system (RDBMS) 460 and clients using the CORBA™ programming model such as client 470. The client using the CORBA™ programming model may make program calls to the server and persist data in the RDBMS. The server includes ENTERPRISE JAVABEANS (EJB™) software components 452 and CORBA™ object request broker 454.

The EJB™ component software architecture from Sun Microsystem Inc. that is used to build applications using the JAVA programming language that run in the server. EJB™ software components use a "container" layer that provides common functions such as security and transaction support and delivers a consistent interface to the applications regardless of the type of server. The CORBA™ programming model is the infrastructure of EJB™ software components, and at the wire level, EJB™ software components look like CORBA™ programming model components.

EJB™ logic is null-capable, however, the legacy CORBA™ programming model implementation does not support null object values. According to a preferred embodiment of the present invention, when glue code 458 extracts a null string object from the EJB™ logic, it replaces it with a predefined sentinel value before passing it to the CORBA™ object request broker. Furthermore, when glue code 458 extracts a sentinel value from the client using the CORBA™ programming model to be persisted in RDBMS 460, it replaces the sentinel value with a null string object before passing it to the EJB™ logic to be stored. Objects are persisted through application logic. Typically, a server application communicates with the backend through glue code. The CORBA™ programming model is typically used as a communication framework for client-server communication and not for server-backend communication.

RDBMS 460 may not support null values. According to a preferred embodiment of the present invention, when glue code 456 extracts a null string object from the EJB™ logic to be stored, it replaces it with a predefined sentinel value before passing it to the RDBMS. Furthermore, when glue code 456 retrieves a sentinel value from the RDBMS, it replaces the sentinel value with a null string object before passing it the EJB™ logic.

In another example, RDBMS 460 may be null-capable. However, the RDBMS may contain a column that is set to "not null-able." In this example, even though the database supports null values, a particular column is designated as not supporting null values. Thus, glue code 456 must provide the null/sentinel translation, as needed.

Figure 5:
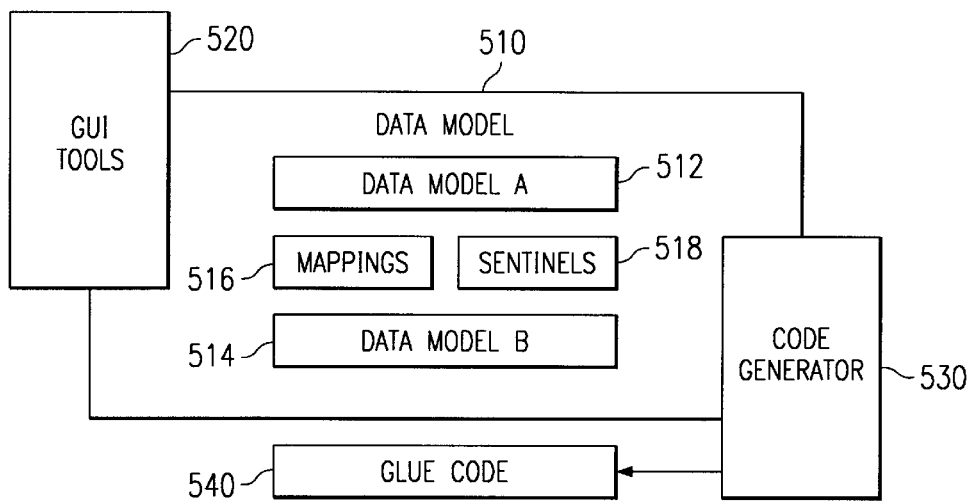
FIG. 5 is a block diagram of a software configuration for generating glue code in accordance with a preferred embodiment of the present invention.

With reference now to FIG. 5, a block diagram of a software configuration for generating glue code is depicted in accordance with a preferred embodiment of the present invention. Data model 510 is configured using graphical user interface (GUI) tools 520. Code generator 530 generates glue code 540 based on the information in the data model.

Data model 510 includes data model 512 for a first software component and data model 514 for a second software component, For example, if the first software component is a component using the JAVA programming language, then data model 512 represents an object-oriented data model. If the second software component is an RDBMS component, then data model 514 is a relational database model. Mapping 516 map data elements in data model 512 to data elements in data model 514. The mappings may be configured using GUI tools 520.

The first software component may be null-capable, while the second software component may not be null-capable. In accordance with a preferred embodiment of the present invention, Data model 510 includes sentinels 518, which associate a sentinel value for each null-able data element in data model 512. The sentinel values may be randomly generated or may be chosen through the GUI tools. Sentinel values also must not represent valid data for the data element. For example, if the data element is a state name, a sentinel value of "ZZ" is acceptable; however, a sentinel value of "NV" is not acceptable, because "NV" represents valid data for the data element.

Figure 6A:
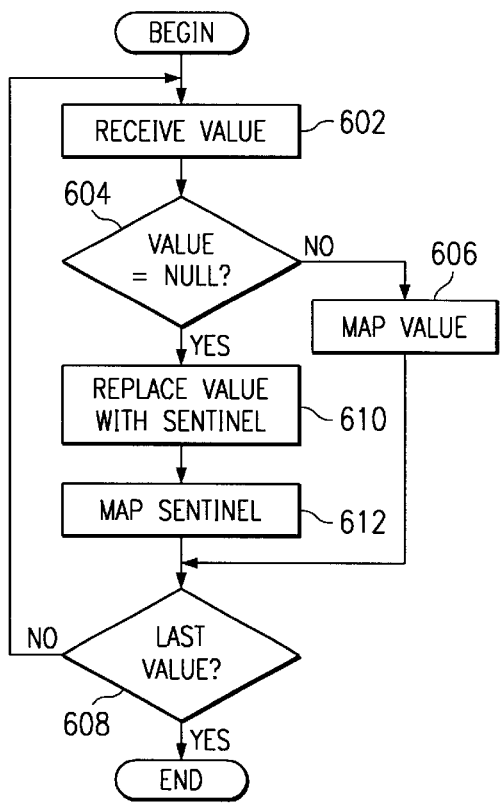
FIG. 6A is a flowchart illustrating a process for passing a value from a null-capable software component to a software component that does not support null values in accordance with a preferred embodiment of the present invention.

With reference to FIG. 6A, a flowchart is shown illustrating a process for passing a value from a null-capable software component to a software component that does not support null values in accordance with a preferred embodiment of the present invention. The process begins and receives a value from the null-capable software component (step 602). A determination is made as to whether the value is null (step 604). If the value is not null, the process maps the value to the software component that does not support null values (step 606) and a determination is made as to whether the value is the last value to be passed (step 608).

Returning to step 604, if the value is null, the process replaces the value with a corresponding sentinel value (step 610) and maps the sentinel value to the software component that does not support null values (step 612). Then, the process proceeds to step 608 to determine whether the value is the last value to be passed.

If the value is the last value to be passed in step 608, the process ends. If the value is not the last value to be passed, the process returns to step 602 to receive the next value.

Figure 6B:
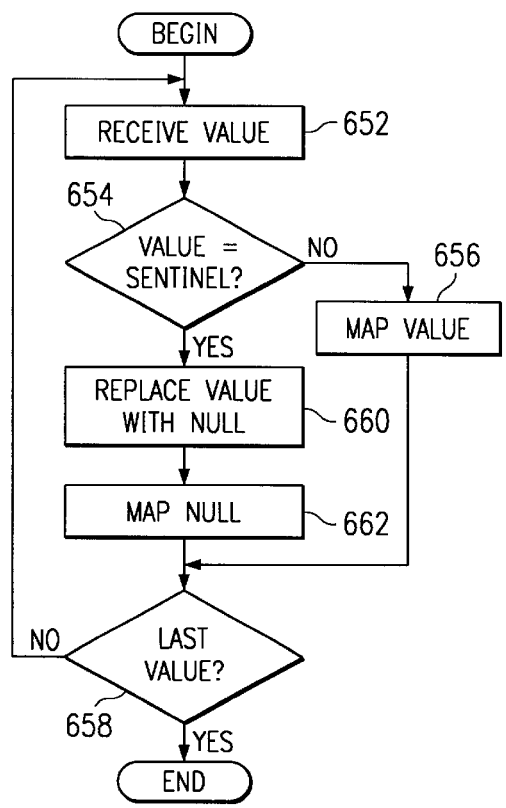
FIG. 6B is a flowchart illustrating a process for passing a value from a software component that does not support null values to a null-capable software component in accordance with a preferred embodiment of the present invention.

Turning now to FIG. 6B, a flowchart is shown illustrating a process for passing a value from a software component that does not support null values to a null-capable software component in accordance with a preferred embodiment of the present invention. The process begins and receives a value from the software component that does not support null values (step 652). A determination is made as to whether the value is a sentinel value (step 654). If the value is not a sentinel value, the process maps the value to the null-capable software component (step 656) and a determination is made as to whether the value is the last value to be passed (step 658).

Returning to step 654, if the value is a sentinel value, the process replaces the value with null (step 660) and maps the null value to the null-capable software component (step 662). Then, the process proceeds to step 658 to determine whether the value is the last value to be passed.

If the value is the last value to be passed in step 658, the process ends. If the value is not the last value to be passed, the process returns to step 652 to receive the next value.

The present invention provides a method and apparatus for passing null references between software components through legacy frameworks. When a software component attempts to pass a null value to a software component that does not support null values, an intermediate framework replaces the null value with a corresponding sentinel value. When a software component that is not null-capable attempts to pass a sentinel value to a null-capable software component, the intermediate framework replaces the sentinel with a null value. A user may designate the sentinel values based on the data models of the software components.

More specifically, a client using the legacy CORBA™ programming model may make program calls to an EJB™ software component and persist data to a relational database that is null-capable. EJB™ software components can also retrieve data from a legacy backend that does not support null values. As another example, EJB™ software component can retrieve null-able data from a null capable backend using legacy glue code that does not support null values.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for passing null values from a first software component to a second software component, comprising:

receiving a null value from the first software component;

replacing the null value with a sentinel value, wherein the sentinel value is a value that is randomly generated in the data processing system; and passing the sentinel value to the second software component.

2. The method of claim 1, wherein the first software component is one of object-oriented logic and a backend.

3. The method of claim 2, wherein the null value is a null object.

4. The method of claim 1, wherein the second software component is one of a communications interface, a backend, and glue code.

5. The method of claim 4, wherein the backend is a database.

6. The method of claim 5, wherein the database is a relational database.

7. The method of claim 6, wherein the sentinel value is a column value.

8. The method of claim 1, wherein the method is performed by glue code.

9. A method in a data processing system for passing null values from a first software component to a second software component, comprising:

receiving a sentinel value from the first software component, wherein the sentinel value is a value that is randomly generated in the data processing system;

replacing the sentinel value with a null value; and passing the null value to the second software component.

10. The method of claim 9, wherein the first software component is one or object-oriented logic, at backend, and glue code.

11. The method of claim 10, wherein the object-oriented logic comprises a communications interface.

12. The method of claim 10, wherein the backend is a database.

13. The method of claim 12, wherein the database is a relational database.

14. The method of claim 13, wherein the sentinel value is a column value.

15. The method of claim 9, wherein the second software component is one of object-oriented logic and a backend.

16. The method of claim 15, wherein the null value is a null object.

17. The method of claim 9, wherein the method is performed by glue code.

18. A method in a data processing system for passing null values from a first software component having a first data model to a second software component having a second data model, comprising:

mapping data elements from the first data model to the second data model to form a mapped data model;

assigning a sentinel value for each null data element in the first data model, wherein the sentinel value is a value that is randomly generated in the data processing system; and generating intermediate code for passing values from the first software component to the second software component based on the mapped data model and the sentinel values.

19. The method of claim 18, wherein the step of mapping data elements comprises:

receiving mapping instructions from a user; and mapping the data elements form the first data model to the second data model based on the mapping instructions.

20. The method of claim 19, wherein the step of receiving mapping instructions from a user comprises receiving the mapping instructions from a graphical user interface.

21. The method of claim 18, wherein the step of assigning a sentinel value for each null data element in the first data model comprises receiving a sentinel value from a user.

22. The method of claim 21, wherein the step of receiving a sentinel value from the user comprises receiving the sentinel value from a graphical user interface.

23. The method of claim 18, wherein the intermediate code is glue code.

24. An apparatus for passing null values from a first software component to a second software component, in a data processing system, comprising:

receipt means for receiving a null value from the first software component;

replacement means for replacing the null value with a sentinel value, wherein the sentinel value is a value that is randomly generated in the data processing system; and passing means for passing the sentinel value to the second software component.

25. The apparatus of claim 24, wherein the first software component is one of object-oriented logic and a backend.

26. The apparatus of claim 24, wherein the second software component is one of a object-oriented logic, a communications interface, a backend, and glue code.

27. The apparatus of claim 26, wherein the object-oriented logic is a communications interface.

28. The apparatus of claim 26, wherein the backend is a database.

29. An apparatus for passing null values from a first software component to a second software component, in a data processing system, comprising:

receipt means for receiving a sentinel value from the first software component, wherein the sentinel value is a value that is randomly generated in the data processing system;

replacement means for replacing the sentinel value with null value; and passing means for passing the null value to the second software component.

30. The apparatus of claim 29, wherein the first software component is one of object-oriented logic, a communications interface, a backend, and glue code.

31. The apparatus of claim 30, wherein the object-oriented logic comprises a communications interface.

32. The apparatus of claim 30, wherein the backend is a database.

33. The apparatus of claim 29, wherein the second software component is one of object-oriented logic and backend.

34. An apparatus for passing null values from a first software component having a first data model to a second software component having a second data model, in a data processing system, comprising:

mapping means for mapping data elements from the first data model to the second data model to form a mapped data model;

assignment means for assigning a sentinel value for each null-able data element in the first data model, wherein the sentinel value is a value that is randomly generated in the data processing system; and code generation means for generating intermediate code for passing value from the first software component to the second software component based on the mapped data model and the sentinel values.

35. The apparatus of claim 34, wherein the mapping means comprises:

means for receiving mapping instructions from a user; and means for mapping the data elements from the first data model to the second data model based on the mapping instructions.

36. The apparatus of claim 35, wherein the means for receiving mapping instructions from a user comprises a graphical user interface.

37. The apparatus of claim 34, wherein the assignment means comprises means for receiving a sentinel value from a user.

38. The apparatus of claim 37, wherein the means for receiving a sentinel value from the user comprises a graphical user interface.

39. The apparatus of claim 34, wherein the intermediate code is glue code.

40. A computer program product, in a data processing system, for passing null values from a first software component to a second software component, comprising:

instructions for receiving a null value from the first software component;

instructions for replacing the null value with a sentinel value, wherein the sentinel value is a value that is randomly generated in the data processing system; and instructions for passing the sentinel value to the second software component.

41. A computer program product, in a data processing system, for passing null values from a first software component to a second software component, comprising:

instructions for receiving a sentinel value from the first software component, wherein the sentinel value is a value that is randomly generated in the data processing system;

instructions for replacing the sentinel value with a null value; and instructions for passing the null value to the second software component.

42. A computer program product, in a data processing system, for passing null values from a first software component having a first data model to a second software component having a second data model, comprising:

instructions for mapping data elements from the first data model to the second data model to form a mapped data model;

instructions for assigning a sentinel value for each null-able data element in the first data model, wherein the sentinel value is a value that is randomly generated in the data processing system; and instructions for generating intermediate code for passing values from the first software component to the second software component based on the mapped data model and the sentinel values.

* * * * *

UNITED STATES PATENT AND TRADEMARK OFFICE
CERTIFICATE OF CORRECTION

PATENT NO. : 6,775,822 B1
DATED : August 10, 2004
INVENTOR(S) : Apte et al.

It is certified that error appears in the above-identified patent and that said Letters Patent is hereby corrected as shown below:

Column 1,
Line 19, after "such as" delete "common object architecture".
Line 23, before "backend" insert -- in --.

Column 5,
Line 6, after "appliance" insert -- . -- (period).
Line 61, before "is used" delete "Microsystem Inc. that" and insert -- Microsystems Inc. --.

Column 6,
Line 1, after "infrastructure" delete "of" and insert -- for --.
Line 43, after "component" delete "," (comma) and insert -- . -- (period).

Column 7,
Line 53, after "software" delete "component" and insert -- components --.
Line 54, after "from a" delete "null capable" and insert -- null-capable --.

Column 8,
Line 45, after "one" delete "or" and insert -- of --.

Column 9,
Line 12, after "elements" delete "form" and insert -- from --.
Line 53, after "with" insert -- a --.
Line 65, after "logic and" insert -- a --.

Column 10,
Line 9, after "for passing" delete "value" and insert -- values --.

Signed and Sealed this

Eleventh Day of October, 2005

JON W. DUDAS
*Director of the United States Patent and Trademark Office*